United States Patent Office 3,752,786
Patented Aug. 14, 1973

3,752,786
POLYURETHANE POLYUREAS
Conrad Rossitto, Andover, and David B. Taylor, Byfield, Mass., assignors to USM Corporation, Boston, Mass.
No Drawing. Filed Nov. 5, 1971, Ser. No. 196,190
Int. Cl. C08g 22/16
U.S. Cl. 260—33.4 UR                         11 Claims

ABSTRACT OF THE DISCLOSURE

The method of making solvent soluble polyurethane polyureas by mixing a solution in a non-reactive solvent of —NCO terminated prepolymer with a solution of a diamine reactive to chain extend the prepolymer in a solvent mixture including a lower aliphatic alcohol.

BACKGROUND OF THE INVENTION

This invention relates to a method for making a polyurethane polyurea and particularly to a method of making a polyurethane polyurea soluble in inexpensive solvents for adhesive and coating use.

DESCRIPTION OF THE PRIOR ART

Polyurethane polyureas have been prepared by reaction of —NCO terminated prepolymers with diamines in non-reactive solvents particularly ketones and other highly efficient solvents such as tetrahydrofurane and dimethyl formamide. The purpose of using ketone diluents has been to control the reaction rate between the diamine and prepolymer; but because of the character of the solvent action or possible chemical interaction, it was taught as necessary, to employ an inert drying agent to obtain the character of reaction desired. Although these solvents are effective to slow down the rate of reaction, the product so obtained does not have the solubility in inexpensive solvents such as toluene which would be desirable for application as adhesive or coatings where the solvent is evaporated from the applied material.

It is the object of the present invention to provide a method for making polyurethane polyureas with an inexpensive solvent mixture for carrying on the reaction and to produce a product having superior solubility and other physical characteristics.

To this end and in accordance with the feature of the present invention, a solution of a —NCO terminated prepolymer is added to a solution of an aliphatic diamine preferably a cycloaliphatic diamine in a mixed solvent including a lower alkyl alcohol.

DESCRIPTION OF THE PREFERRED EMBODIMENT

The —NCO terminated prepolymer forming one of the reactive materials employed in the present invention is a reaction product of an —OH terminated polymeric material with a polyisocyanate in excess of the stoichiometric amount, preferably in proportion to provide about 2 —NCO groups to 1 —OH group, so that the resulting reaction product contains active —NCO groups. The preferred —OH terminated polymeric materials include polyalkyleneether glycols having a molecular weight from 400 to 4,000 and polyesters which may be prepared by reaction of a caprolactone and an initiator such as ethylene glycol or other diols, for example, the materials available under the trade name of "NIAX" polyols. The polyesters, derived from caprolactone, may be used alone or in combination with polyesters from reaction of dihydric alcohols and dicarboxylic acids or the polyesters from dihydric alcohols and dicarboxylic acids may be used alone. It is preferred that the polyester materials have a molecular weight from about 400 to about 4,000. Any of the usual diisocyanates may be used for reaction with the polyester to form the prepolymer. Aliphatic diisocyanates such as hexamethylene diisocyanates such as hexamethylene diisocyanate 2,2,4-trimethyl hexamethylene diisocyanate, cyclohexylene diisocyanate, isophorone diisocyanate and methylene dicyclohexane diisocyanate offer the advantage that their reaction rate in the final reaction is relatively low. However, aromatic diisocyanates such as tolylene diisocyanate or diphenylmethylene diisocyanate may also be used. No special procedure for making the prepolymer is required although for convenience in later use in the process, the reaction may be carried out in solution in a solvent to be used later, for example, in toluene. The solvent, if used may be in an amount which will result in a prepolymer solution having a viscosity suitable for simplifying addition to and mixing with the diamine solution.

For reaction with the —NCO terminated prepolymer, cycloaliphatic diamines are preferred and isophorone diamine and menthane diamine have been found particularly satisfactory. Other diamines such as 1,3-di-4-piperidyl propane, 1.4-bis (methylamino) cyclohexane, 2,2,4-trimethyl-1,6-hexane diamine and mixtures of these may also be used.

The solvent mixture for dissolving the diamine includes a lower alkyl alcohol having from 1 to 5 carbon atoms and may include an inert volatile organic liquid such as the aromatics including toluene, xylene, benzene and aromatic naphthas, tetrahydrofurane and dimethylformamide or mixtures of these with up to about 50% by weight of other organic liquids such as volatile aliphatic organic liquids which may not of themselves have the required solvent ability. The solvent mixture for the diamine will contain enough alcohol so that the solvent in the reaction mixture will have at least 10% of the alcohol and may contain as much as 90% of the alcohol. Preferred ranges are from about 10% to about 25% alcohol by weight based on the weight of the solvent in the reaction mixture. Sufficient of the mixed solvent is used to provide a solution of the diamine containing from about 1% to about 20% of the diamine, preferably from about 2% to about 3% of the diamine, by weight based on the weight of the solution. In general, it is desirable that the concentration of the prepolymer solution and of the diamine solution be selected so that the final concentration after combination is from about 10% to about 50% by weight solids.

Reaction to form the polyurethane polyureas is effected by addition of the solution of —NCO terminated prepolymer to the solution of diamine with agitation. The prepolymer and diamine solution are combined in proportions providing from about 1 to about 1.15 amine groups for each isocyanate group. A very desirable reaction rate is achieved to provide superior polyurethane polyureas where the reaction is carried on at room temperature, but reaction temperatures of from about 10° C. to about 100° C. may be employed.

It is a surprising feature of the reaction that, although alcohol itself has a reactive hydrogen which is potentially reactive with the —NCO groups of the prepolymer, the —NCO groups combine preferentially with the hydrogen of the named diamines rather than with the hydrogen of the alcohol while at the same time, because of the dilution factor, the reaction to form the polyurethane polyureas proceeds at a rate to give a soluble resin having a molecular weight sufficiently high to provide good hardness and high tensile strength.

The following examples are given to aid in understanding the invention; but it is to be understood that the invention is not limited to the particular reagents, solvents, concentrations, temperatures or other details of the examples.

Example I

Polypropylene glycol having a molecular weight of about 1,000 was combined with tolylene diisocyanate in proportions giving a ratio of 2 —NCO groups to 1 —OH group. The resulting prepolymer was diluted with toluene in proportion to provide 67 parts by weight of prepolymer with 33 parts by weight of toluene. This solution was added over a period of about 1 hour at room temperature to 264 parts by weight of a 3% solution of isophorone diamine in isopropanol. After completion of the addition, reaction was continued for a further 15 minutes. The resulting polymer solution had a solids content of 22%, a Brookfield viscosity at 25° C. of 750 cps. The solution was spread in a thin film and the solvent allowed to evaporate at room temperature. The resulting dried film had a tensile strength at break of 3,300 pounds per square inch and an elongation of 510%. The material also had a 100% modulus of 345 pounds per square inch and T/G of —39° C.

Example 2

Polypropylene glycol having a molecular weight of about 1,000 was reacted with methylene dicyclohexylene diisocyanate in proportions giving a ratio of 2 —NCO groups to 1 —OH group. 206 parts by weight of the resulting prepolymer were diluted with 103 parts of toluene. This solution was added to 809 parts of a 2.75% by weight solution of isophorone diamine in isopropanol, the addition being carried out in the course of about one hour. When addition was complete, reaction was continued for a further 15 minutes.

The solution had a solids content of 21% and a Brookfield viscosity at 25° C. of 1,276 centipoises. The solution was spread in a thin layer and dried at room temperature by evaporation of solvent. The resulting dried film had a tensile strength of 4,200 pounds per square inch. An elongation of 410%, a modulus of 926 pounds per square inch and a T/G of —45° C.

Example 3

Polypropylene glycol having a molecular weight of about 1,000 was reacted with isophorone diisocyanate in proportions giving a ratio of 2 —NCO groups to 1 —OH group. The resulting —NCO terminated prepolymer was diluted with toluene in proportions providing 380 parts by weight of prepolymer with 332 parts by weight of toluene. This solution was added at room temperature over a period of about 1 hour to 400 parts by weight of a 14% by weight solution of dipiceridylpropane in ethyl alcohol. The resulting polymer solution had a solids content of about 40% by weight, a Brookfield viscosity at 25° C. of about 25,620 cps. The solution was spread in a thin film and the solvent allowed to evaporate at room temeprature. The resulting dried film had an ultimate tensile strength of about 300 pounds per square inch and an ultimate elongation of 1,000%.

Example 4

A polycaprolactone diol having a molecular weight of about 2,000 was reacted with isophorone diisocyanate in proportions providing a ratio of 2 —NCO groups to 1 —OH group. 231 parts by weight of the resulting —NCO terminated prepolymer were diluted with 388 parts by weight to toluene. The resulting solution was added over about a period of 1 hour to 412 parts by weight of a 4.5% by weight solution of isophorone diamine in isopropanol. After completion of the addition, reaction was continued to a further 15 minutes. The resulting solution had a solids content of about 24.7% by weight and a Brookfield viscosity at 25° C. of 6,732 cps. A dried film of the composition had a tensile strength of 6,100 pounds per square inch and an ultimate elongation of 540%. The material had a 100% modulus of 385 pounds per square inch.

Example 5

206 parts by weight of the prepolymer of Example 1 was dissolved in 103 parts by weight of dimethylformamide. The resulting solution was added to 811 parts by weight of 2.9% by weight solution of 2,2,4 trimethyl hexamethylene diamine in methanol over a period of about 1 hour at room temperature. The resulting polymer solution had a solids content of 19.3% by weight and was thixotropic. A dried film prepared from the solution had a tensile strength of 458 pounds per square inch and an ultimate elongation of 835 percent. The material had a 100% modulus of 127 pounds per square inch and a T/G of —37° C.

Having thus described our invention, what we claim as new and desire to secure by Letters Patent of the United States is:

1. The method of making a polyurethane polyurea solution comprising the steps of mixing an —NCO terminated prepolymer from reaction of a polyol having a molecular weight of from about 400 to about 4,000 with a polyisocyanate in proportions to provide about 2 —NCO groups to 1 —OH group, with a solution of a diamine containing an amount of a lower alkyl alcohol to provide in the reaction mixture from about 10% to about 90% by weight of alcohol based on the weight of solvent in the reaction mixture, the balance of solvent in said reaction mixture being a volatile inert organic solvent liquid, said diamine solution providing from about 1 to about 1.15 amine groups for each isocyanate group, and reacting —NCO groups of the prepolymer with active hydrogens of the amine groups of the diamine.

2. The method of making a polyurethane polyurea solution as defined in claim 1 in which said diamine is a cycloaliphatic diamine, the solvent liquid in said diamine solution consists of an alkyl alcohol having from 1 to 5 carbon atoms and said diamine is present to the extent of from about 1% to about 20% by weight based on the weight of said diamine solution, and in which the solvent in the reaction mixture comprises a volatile aromatic hydrocarbon liquid and from about 10% to about 25% by weight of said alcohol.

3. The method of making a polyurethane polyurea solution as defined in claim 2 in which said diamine is selected from the group consisting of isophorone diamine, 1,3-dipiperidyl propane, 1,4-bis (methylamine) cyclohexane, 2,2,4-trimethyl-1,6-hexane diamine and mixtures of these and in which the combined weight of said prepolymer and said diamine is from about 10% to about 50% by weight based on the weight of the prepolymer and diamine solution.

4. The method of making a polyurethane polyurea solution as defined in claim 3 in which said polyisocyanate is an aliphatic diisocyanate.

5. The method of making a polyurethane polyurea solution as defined in claim 4 in which said polyol is an hydroxyl terminated polyester derived from caprolactone and said diamine solution contains from about 2 to about 3% of diamine by weight based on the weight of the solution.

6. The method of making a polyurethane polyurea solution as defined in claim 4 in which said polyol is a polyalkylene ether glycol and said diamine solution contains from about 2 to about 3% of diamine by weight based on the weight of the solution.

7. The method of making a polyurethane polyurea solution as defined in claim 5 in which said diamine is isophorone diamine.

8. The method of making a polyurethane polyurea solution as defined in claim 5 in which the diamine is menthane diamine.

9. The method of making a polyurethane polyurea solution as defined in claim 6 in which said diamine is isophorone diamine.

10. The method of making a polyurethane solution as defined in claim 6 in which said diamine is a methane diamine.

11. The method of making a polyurethane polyurea solution as defined in claim 6 in which said polyisocyanate is isophorone diisocyanate.

References Cited
UNITED STATES PATENTS 3,645,976  2/1972  Suzuki et al. ___ 260—77.5 AN
3,401,133  9/1968  Grace et al. ___ 260—77.5 AN

FOREIGN PATENTS 1,210,737  10/1970  Great Britain ___ 260—77.5 AN

DONALD E. CZAJA, Primary Examiner

M. J. WELSH, Assistant Examiner

U.S. Cl. X.R.

260—75 NH, 77.5 MA, 77.5 AN, 77.5 AA

PO-1050
(5/69)

UNITED STATES PATENT OFFICE
CERTIFICATE OF CORRECTION

Patent No. 3,752,786　　　　　　　Dated August 14, 1973

Inventor(s) Conrad Rossitto and David B. Taylor

It is certified that error appears in the above-identified patent and that said Letters Patent are hereby corrected as shown below:

Claim 3, Line 45, after isophorone diamine add --methane diamine,--

Claim 9, Line 73, change 6 to --7--

Claim 10, Line 2, change 6 to --7--

Claim 11, Line 2, change 6 to --7--

Signed and sealed this 18th day of December 1973.

(SEAL)
Attest:

EDWARD M. FLETCHER, JR.　　　　RENE D. TEGTMEYER
Attesting Officer　　　　　　　　Acting Commissioner of Patents